United States Patent
Kojima et al.

(10) Patent No.: US 7,466,292 B2
(45) Date of Patent: Dec. 16, 2008

(54) PLASMA DISPLAY APPARATUS

(75) Inventors: Ayahito Kojima, Kawasaki (JP);
Hiroyuki Wakayama, Kawasaki (JP);
Hirohito Kuriyama, Kawasaki (JP);
Akira Yamamoto, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 288 days.

(21) Appl. No.: 11/272,142

(22) Filed: Nov. 14, 2005

(65) Prior Publication Data

US 2006/0152439 A1 Jul. 13, 2006

Related U.S. Application Data

(63) Continuation of application No. 09/626,967, filed on Jul. 27, 2005, now Pat. No. 7,053,868.

(30) Foreign Application Priority Data

Sep. 17, 1999 (JP) ................ 11-264490

(51) Int. Cl.
*G09G 3/28* (2006.01)
(52) U.S. Cl. ............... 345/60; 345/63; 345/89
(58) Field of Classification Search ........... 345/60, 345/63, 72, 87, 89, 690, 41, 37
See application file for complete search history.

(56) References Cited

U.S. PATENT DOCUMENTS

| 5,818,419 A | 10/1998 | Tajima et al. |
| 5,854,540 A | 12/1998 | Matsumoto et al. |
| 5,940,142 A | 8/1999 | Wakitani et al. |
| 6,097,358 A | 8/2000 | Hirakawa et al. |
| 6,222,512 B1 | 4/2001 | Tajima et al. |
| 6,429,833 B1 * | 8/2002 | Ryeom et al. ......... 345/63 |
| 6,496,164 B1 * | 12/2002 | Kuwahara et al. ...... 345/60 |
| 6,525,701 B1 * | 2/2003 | Kang ................ 345/60 |
| 6,535,224 B2 * | 3/2003 | Kuriyama et al. ...... 345/690 |

FOREIGN PATENT DOCUMENTS

| EP | 698 874 | 2/1996 |
| EP | 0 837 441 | 4/1998 |
| EP | 833 299 | 4/1998 |
| JP | 11-65521 | 3/1999 |
| JP | 11-95719 | 4/1999 |
| JP | 11-146306 | 5/1999 |

* cited by examiner

*Primary Examiner*—Guy J Lamarre
*Assistant Examiner*—Fritz Alphonse
(74) *Attorney, Agent, or Firm*—Staas & Halsey LLP

(57) ABSTRACT

According to the present invention, a plasma display apparatus, which represents the luminance of one frame in accordance with a combination of plural sub-frames having luminance levels corresponding to a plurality of weighted values, additionally includes a sub-frame having a luminance level lower than the minimum gray scale level of luminance which can be represented by the number of bits in the input video data. Such plasma display apparatus turns on a desired combination of the sub-frames so as to increase the resolution of the luminance without increasing the conventional number of gray scale levels included in the input video data. In a preferred embodiment, especially when the added smaller luminance sub-frame is included in a combination of sub-frames for a low luminance area, the resolution of the gray scale of the low luminance area can be increased, and the representation of gray scale can be enhanced in a low luminance area to which the sight of a person is more sensitive.

5 Claims, 16 Drawing Sheets

Characteristics of Conversion Table
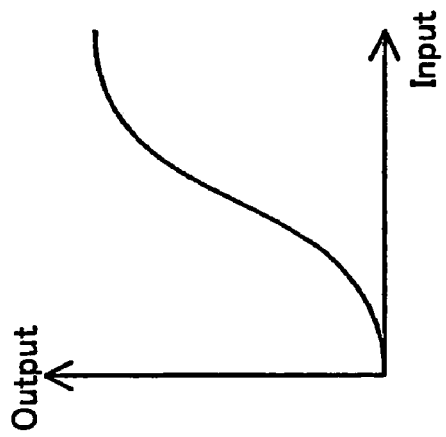
FIG. 6A — Linear
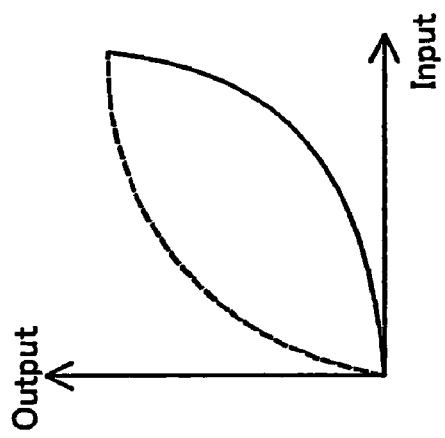
FIG. 6B — γ
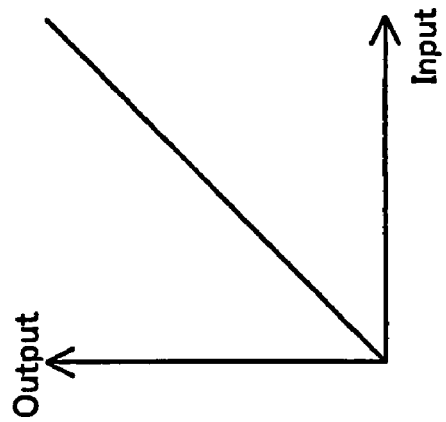
FIG. 6C — S

FIG. 7

Conversion Table (1)

| Input Gray Scale | SF0 (0.5) | SF1 (1) | SF2 (2) | SF3 (4) | SF4 (8) | SF5 (16) | SF6 (32) | SF7 (64) | SF8 (128) | Luminance |
|---|---|---|---|---|---|---|---|---|---|---|
| 0 | | | | | | | | | | 0 |
| 1 | 1 | | | | | | | | | 0.5 |
| 2 | | 1 | | | | | | | | 1.0 |
| 3 | 1 | 1 | | | | | | | | 1.5 |
| 4 | | | 1 | | | | | | | 2.0 |
| 5 | 1 | | 1 | | | | | | | 2.5 |
| 6 | | 1 | 1 | | | | | | | 3.0 |
| 7 | 1 | 1 | 1 | | | | | | | 3.5 |
| 8 | | | | 1 | | | | | | 4.0 |
| | | | | | | | | | | |
| 121 | 1 | | | 1 | 1 | 1 | 1 | | | 60.5 |
| 122 | | 1 | | 1 | 1 | 1 | 1 | | | 61.0 |
| 123 | 1 | 1 | | 1 | 1 | 1 | 1 | | | 61.5 |
| 124 | | | 1 | 1 | 1 | 1 | 1 | | | 62.0 |
| 125 | 1 | | 1 | 1 | 1 | 1 | 1 | | | 62.5 |
| 126 | | 1 | 1 | 1 | 1 | 1 | 1 | | | 63.0 |
| 127 | 1 | 1 | 1 | 1 | 1 | 1 | 1 | | | 63.5 |
| 128 | | | | | | | | 1 | | 64 |
| 129 | | | 1 | | | | | 1 | | 66 |
| 130 | | | | 1 | | | | 1 | | 68 |
| 131 | | | 1 | 1 | | | | 1 | | 70 |
| 132 | | | | | 1 | | | 1 | | 72 |
| 133 | | | 1 | | 1 | | | 1 | | 74 |
| 134 | | | | 1 | 1 | | | 1 | | 76 |
| 135 | | | 1 | 1 | 1 | | | 1 | | 78 |
| 136 | | | | | | 1 | | 1 | | 80 |
| | | | | | | | | | | |
| 248 | | | | | | 1 | 1 | 1 | 1 | 240 |
| 249 | | | 1 | | | 1 | 1 | 1 | 1 | 242 |
| 250 | | | | 1 | | 1 | 1 | 1 | 1 | 244 |
| 251 | | | 1 | 1 | | 1 | 1 | 1 | 1 | 246 |
| 252 | | | | | 1 | 1 | 1 | 1 | 1 | 248 |
| 253 | | | 1 | | 1 | 1 | 1 | 1 | 1 | 250 |
| 254 | | | | 1 | 1 | 1 | 1 | 1 | 1 | 252 |
| 255 | 1 | 1 | 1 | 1 | 1 | 1 | 1 | 1 | 1 | 255.5 |

FIG. 11

Conversion Table (2)

| Input Gray Scale | SF0 (0.5) | SF1 (1) | SF2 (2) | SF3 (4) | SF4 (8) | SF5 (16) | SF6 (32) | SF7 (32) | SF8 (32) | SF9 (64) | SF10 (64) | Luminance |
|---|---|---|---|---|---|---|---|---|---|---|---|---|
| 0 | | | | | | | | | | | | 0 |
| 1 | 1 | | | | | | | | | | | 0.5 |
| 2 | | 1 | | | | | | | | | | 1.0 |
| 3 | 1 | 1 | | | | | | | | | | 1.5 |
| 4 | | | 1 | | | | | | | | | 2.0 |
| 5 | 1 | | 1 | | | | | | | | | 2.5 |
| 6 | | 1 | 1 | | | | | | | | | 3.0 |
| 7 | 1 | 1 | 1 | | | | | | | | | 3.5 |
| 8 | | | | 1 | | | | | | | | 4.0 |
| | | | | | | | | | | | | |
| 121 | 1 | | | 1 | 1 | 1 | 1 | | | | | 60.5 |
| 122 | | 1 | | 1 | 1 | 1 | 1 | | | | | 61.0 |
| 123 | 1 | 1 | | 1 | 1 | 1 | 1 | | | | | 61.5 |
| 124 | | | 1 | 1 | 1 | 1 | 1 | | | | | 62.0 |
| 125 | 1 | | 1 | 1 | 1 | 1 | 1 | | | | | 62.5 |
| 126 | | 1 | 1 | 1 | 1 | 1 | 1 | | | | | 63.0 |
| 127 | 1 | 1 | 1 | 1 | 1 | 1 | 1 | | | | | 63.5 |
| 128 | | | | | | | | 1 | 1 | | | 64 |
| 129 | | | 1 | | | | | 1 | 1 | | | 66 |
| 130 | | | | 1 | | | | 1 | 1 | | | 68 |
| 131 | | | 1 | 1 | | | | 1 | 1 | | | 70 |
| 132 | | | | | 1 | | | 1 | 1 | | | 72 |
| 133 | | | 1 | | 1 | | | 1 | 1 | | | 74 |
| 134 | | | | 1 | 1 | | | 1 | 1 | | | 76 |
| 135 | | | 1 | 1 | 1 | | | 1 | 1 | | | 78 |
| 136 | | | | | | 1 | | 1 | 1 | | | 80 |
| | | | | | | | | | | | | |
| 248 | | | | | | 1 | 1 | 1 | 1 | 1 | 1 | 240 |
| 249 | | | 1 | | | 1 | 1 | 1 | 1 | 1 | 1 | 242 |
| 250 | | | | 1 | | 1 | 1 | 1 | 1 | 1 | 1 | 244 |
| 251 | | | 1 | 1 | | 1 | 1 | 1 | 1 | 1 | 1 | 246 |
| 252 | | | | | 1 | 1 | 1 | 1 | 1 | 1 | 1 | 248 |
| 253 | | | 1 | | 1 | 1 | 1 | 1 | 1 | 1 | 1 | 250 |
| 254 | | | | 1 | 1 | 1 | 1 | 1 | 1 | 1 | 1 | 252 |
| 255 | 1 | 1 | 1 | 1 | 1 | 1 | 1 | 1 | 1 | 1 | 1 | 255.5 |

FIG. 15

Conventional Data Conversion Table

| Input Gray Scale | SF1 (1) | SF2 (2) | SF3 (4) | SF4 (8) | SF5 (16) | SF6 (32) | SF7 (64) | SF8 (128) | Luminance |
|---|---|---|---|---|---|---|---|---|---|
| 0 |   |   |   |   |   |   |   |   | 0 |
| 1 | 1 |   |   |   |   |   |   |   | 1 |
| 2 |   | 1 |   |   |   |   |   |   | 2 |
| 3 | 1 | 1 |   |   |   |   |   |   | 3 |
| 4 |   |   | 1 |   |   |   |   |   | 4 |
| 5 | 1 |   | 1 |   |   |   |   |   | 5 |
| 6 |   | 1 | 1 |   |   |   |   |   | 6 |
| 7 | 1 | 1 | 1 |   |   |   |   |   | 7 |
| 8 |   |   |   | 1 |   |   |   |   | 8 |
|   |   |   |   |   |   |   |   |   |   |
| 121 | 1 |   |   | 1 | 1 | 1 | 1 |   | 121 |
| 122 |   | 1 |   | 1 | 1 | 1 | 1 |   | 122 |
| 123 | 1 | 1 |   | 1 | 1 | 1 | 1 |   | 123 |
| 124 |   |   | 1 | 1 | 1 | 1 | 1 |   | 124 |
| 125 | 1 |   | 1 | 1 | 1 | 1 | 1 |   | 125 |
| 126 |   | 1 | 1 | 1 | 1 | 1 | 1 |   | 126 |
| 127 | 1 | 1 | 1 | 1 | 1 | 1 | 1 |   | 127 |
| 128 |   |   |   |   |   |   |   | 1 | 128 |
| 129 | 1 |   |   |   |   |   |   | 1 | 129 |
| 130 |   | 1 |   |   |   |   |   | 1 | 130 |
| 131 | 1 | 1 |   |   |   |   |   | 1 | 131 |
| 132 |   |   | 1 |   |   |   |   | 1 | 132 |
| 133 | 1 |   | 1 |   |   |   |   | 1 | 133 |
| 134 |   | 1 | 1 |   |   |   |   | 1 | 134 |
| 135 | 1 | 1 | 1 |   |   |   |   | 1 | 135 |
| 136 |   |   |   | 1 |   |   |   | 1 | 136 |
|   |   |   |   |   |   |   |   |   |   |
| 248 |   |   |   | 1 | 1 | 1 | 1 | 1 | 248 |
| 249 | 1 |   |   | 1 | 1 | 1 | 1 | 1 | 249 |
| 250 |   | 1 |   | 1 | 1 | 1 | 1 | 1 | 250 |
| 251 | 1 | 1 |   | 1 | 1 | 1 | 1 | 1 | 251 |
| 252 |   |   | 1 | 1 | 1 | 1 | 1 | 1 | 252 |
| 253 | 1 |   | 1 | 1 | 1 | 1 | 1 | 1 | 253 |
| 254 |   | 1 | 1 | 1 | 1 | 1 | 1 | 1 | 254 |
| 255 | 1 | 1 | 1 | 1 | 1 | 1 | 1 | 1 | 255 |

PLASMA DISPLAY APPARATUS

CROSS-REFERENCE TO RELATED APPLICATIONS

This application is a Continuation of U.S. patent application Ser. No. 09/626,967, filed Jul. 27, 2005, now U.S. Pat. No. 7,053,868, and claims the benefit of Japanese Application No. 11-264490, filed Sep. 17, 1999.

BACKGROUND OF THE INVENTION

1. Field of the Invention

The present invention relates to a plasma display apparatus, and relates in particular to a plasma display apparatus which has an improved data converter and which can display a higher quality image.

2. Description of the Related Art

A plasma display apparatus is so designed that a predetermined number of electrodes are formed on paired, facing substrates separated by a discharge space, that plasma discharges are generated between opposed electrodes, that phosphors formed on the substrates are excited by ultraviolet rays produced by the plasma discharges, and that a predetermined image is displayed. Furthermore, the number of discharges in each frame is controlled, so that an image having a desired luminance can be displayed.

FIG. 14 is a diagram for explaining sub-frame system for a conventional three-electrodes surface discharge plasma display panel. With a three-electrode surface discharge AC plasma display, one frame is divided into a plurality of sub-frames SF, and the luminance level is represented by the ratio for the numbers of the sustain discharge pulses in the sub-frames. Provided for each sub-frame SF are: a reset period RST, for resetting a whole panel; an address period ADD, during which a cell to be displayed is discharged in accordance with desired image data and wall charges are accumulated; and a sustain period SUS, during which, for a cell wherein wall charges are accumulated when a discharge occurs during the address period ADD, sustain discharging is repeated the number of times which corresponds to the ratio for the luminance level of the sub-frame.

In the example in FIG. 14, one frame is formed of eight sub-frames SF1 to SF8, and the ratio for the sustain discharges of the sub-frames SF1 to SF8 is set as 1:2:4:8:16:32:64:128. Accordingly, the same ratio is applied to the luminance represented by the sub-frames. Thus, the desired luminance for one frame can be displayed in accordance with a predetermined combination of sub-frames.

Video data (or image data) input to a plasma display apparatus are normally digital data designating gray scale of RGB colors in individual frames. Therefore, the plasma display apparatus includes a data converter for converting the gray scale color data of each frame into display data which are constituted by combinations of sub-frames. Generally, the data converter can be implemented by a conversation table.

FIG. 15 is an example conversion table for a conventional data converter, and FIGS. 16A and 16B are graphs showing the characteristic of the conversion table in FIG. 15. In the examples of FIGS. 15 and 16, eight-bit input video data having 256 gray scales are converted into output display data which specify the ON/OFF states of the eight sub-frames SF1 to SF8, so that a luminance level of 0 to 255 is displayed within one frame. For example, when the gray scale level of the input video data is 7, the sub-frames SF1(1), SF2(2) and SF3(4) are turned on, and when the gray scale level of the input video data is 255, all the sub-frames SF1(1) to SF8(128) are turned on.

As is shown in FIG. 16A, the characteristic of the conventional conversion table is a linear function, according to which the luminance level of the output display data is incremented by one when the gray scale of the input video data is incremented by one, and corresponds to a binary counter value. In accordance with the characteristic, in the conversion table in FIG. 15 the luminance levels 0 to 255 of the output display data respectively correspond to the gray scale levels of 0 to 255 for the input video data. In FIG. 16B, a partially detailed characteristic curve is shown which corresponds to the conversion table in FIG. 15, and in all the areas wherein the gray scale levels of the input video data are from close to 0 up to 255, the luminance level of the output display data is incremented by one at the same time the gray scale of the input video data is incremented by one.

The conversion table or the conversion characteristic of the conventional data converter depicts a linear function whereby the luminance level is uniformly increased or reduced in all gray scale areas wherein the input video data is used. However, according to this conversion characteristic, in a low luminance area the number of luminance levels to which the sight of a person is most sensitive insufficient, and the luminance level for a dark image is unsatisfactory. That is, the luminance resolution for a dark image is not satisfactory. On the other hand, since in a high luminance area the sight of a person is not as sensitive as it is in a low luminance area, in a high luminance area there are more levels than is necessary.

Furthermore, externally input video data tend to be modulated by gamma compensation from an original video signal. The gamma compensation for such a video signal is performed in accordance with the gamma characteristic of a display device, such as CRT which has more luminance levels in a low input area. However, since the plasma display apparatus having the conversion characteristic shown in FIGS. 15 and 16 does not have such a gamma characteristic, for the input video data with gamma compensation, the gray scale levels cannot be represented appropriately in a low luminance area, so luminance resolution in the low luminance area is lost.

In addition, since the conventional data converter employs the same conversion table or conversion characteristic shown in FIGS. 15 and 16 for the three primary colors, RGB, the color balance (tint) cannot be changed. Generally, a display image having a low color temperature, such as reddish white, is preferred in the Europe and U.S.A., while an image having a high color temperature, such as bluish white, is preferred in Japan. However, the conventional plasma display apparatus cannot provide with the difference between the color temperatures. Further, because of the characteristics of the phosphors, a different luminance may be produced for each color for a predetermined same sustain discharge count.

SUMMARY OF THE INVENTION

It is, therefore, one objective of the present invention to provide a plasma display apparatus which can increase the gray scale levels in a low luminance area.

It is another objective the present invention to provide a plasma display apparatus which generates output display data for input video data in accordance with an arbitrary conversion characteristic.

It is an additional objective of the present invention to provide a plasma display apparatus which can selectively display images having desired color temperatures.

It is a further objective of the present invention to provide a plasma display apparatus having a gamma characteristic.

To achieve the above objectives, according to one aspect of the present invention, a plasma display apparatus, which represents the luminance of one frame in accordance with a combination of plural sub-frames having luminance levels corresponding to a plurality of weighted values, additional includes a sub-frame having a luminance level lower than the minimum gray scale level of luminance which can be represented by the number of bits in the input video data. Such plasma display apparatus turns on a desired combination of the sub-frames so as to increase the resolution of the luminance without increasing the conventional number of gray scale levels included in the input video data.

In a preferred embodiment, especially when the added smaller luminance sub-frame is included in a combination of sub-frames for a low luminance area, the resolution of the gray scale of the low luminance area can be increased, and the representation of gray scale can be enhanced in a low luminance area to which the sight of a person is more sensitive.

In another preferred embodiment, the added smaller luminance sub-frame is selectively employed to set a different conversion characteristic for each RGB color, and an image having a desired color temperature is selectively displayed.

To achieve the above objectives, according to another aspect of the invention, a plasma display apparatus, which represents the luminance of one frame in accordance with a combination of sub-frames having predetermined luminance levels, comprises:

a data converter for converting input video data into output data in which the ON/OFF states of the sub-frames are specified;

wherein the sub-frames include a smaller luminance sub-frame having a luminance level which is lower than the minimum gray scale level of luminance which can be represented by the number of bits in the input video data.

In the preferred embodiments, the data converter has a conversion characteristic in which an increase rate of the luminance of the output data in a first gray scale area for input video data is lower than an increase rate of the luminance of the output data in a second gray scale area whose luminance is higher than that in the first gray scale area.

According to the preferred embodiments, the data converter has a plurality of conversion characteristics, and a desired conversion characteristic is selected in accordance with a mode set signal for selecting the conversion characteristics.

According to the preferred embodiments, the input video data are supplied in accordance with a plurality of primary colors, and the conversion characteristics of the data converter are selectively determined for each of the primary colors.

According to the preferred embodiments, the data converter converts the input video data into output data, which includes more bits than that used for the input video data.

In the preferred embodiments, the data converter has a conversion characteristics, in which an increase rate of the luminance of the output data in a first gray scale area for the input video data, differs from an increase rate of the luminance of the output data in a second gray scale area, whose luminance is higher than that in the first gray scale area.

Furthermore, to achieve the above objectives, provided is a data converter, for a plasma display apparatus which represents the luminance of one frame in accordance with a combination of sub-frames having predetermined luminance levels, wherein video input data are converted into output data in which the ON/OFF states the plurality of sub-frames are specified, and wherein the sub-frames include a smaller luminance sub-frame which has a luminance level lower than the minimum gray scale level of luminance which can be represented by the number of bits in the input video data.

According to the preferred embodiments, the data converter of the plasma display apparatus has a conversion characteristic in which an increase rate of the luminance of the output data in a first gray scale area for the input video data is lower (or higher) than an increase rate of the luminance of the output data in a second gray scale area, whose luminance is higher than that in the first gray scale area.

BRIEF DESCRIPTION OF THE DRAWINGS

FIGS. 6A to 6C are graphs showing a conversion table stored in the data converter;

FIG. 7 is a diagram showing a conversion table for a gamma characteristic according to the embodiment of the present invention;

FIG. 11 is a diagram showing a conversion table for gamma characteristic when a superimposition method is employed;

FIG. 15 is a diagram showing an example conversion table for a conventional data converter.

DETAILED DESCRIPTION OF THE PREFERRED EMBODIMENTS

The preferred embodiments of the present invention will now be described while referring to the accompanying drawings. It should be noted, however, that the technical scope of the present invention is not limited to these embodiments.

Figure 1:
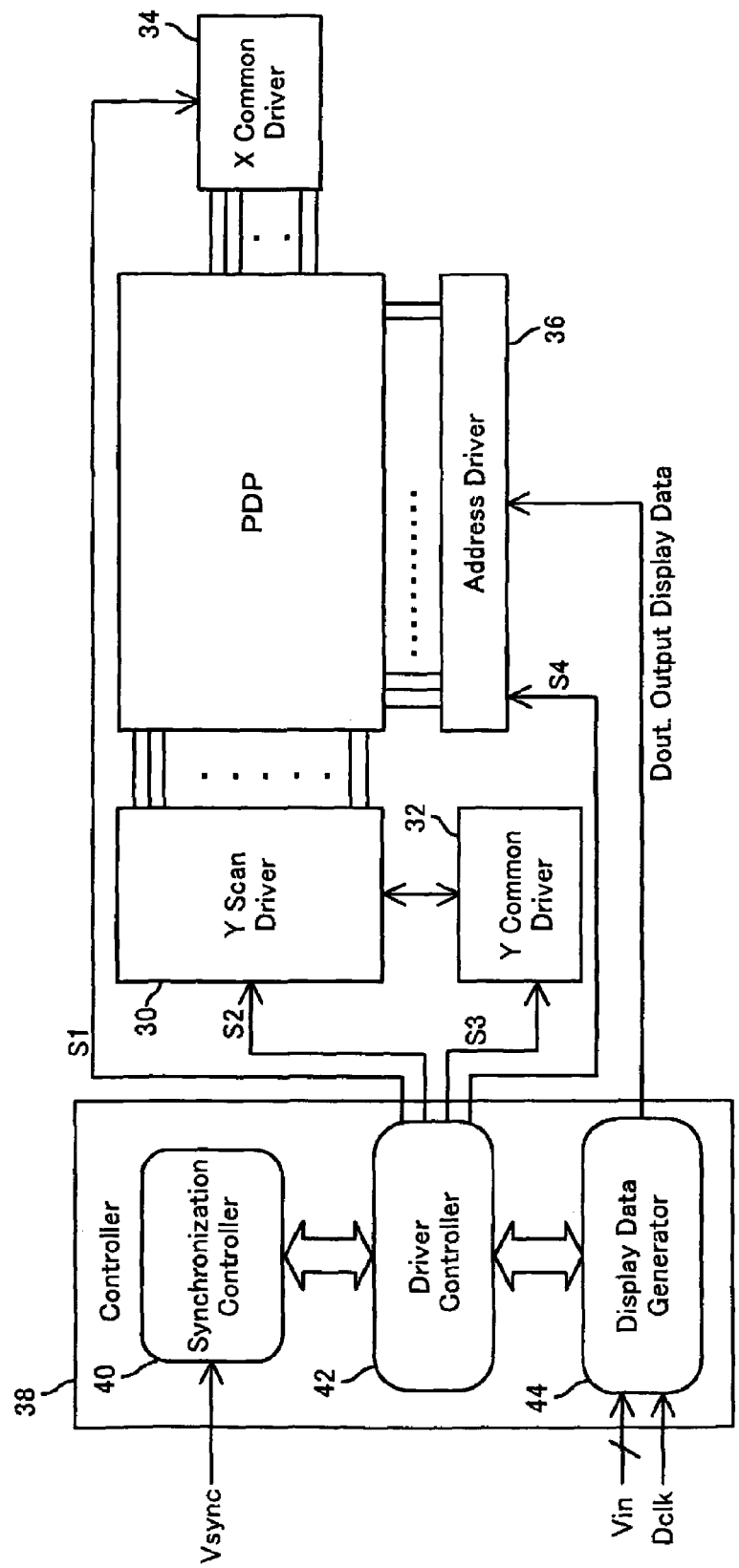
FIG. 1 a schematic diagram illustrating a plasma display apparatus according to one embodiment of the present invention.

FIG. 1 is a schematic diagram illustrating the arrangement of a plasma display apparatus according to one embodiment of the present invention. The plasma display apparatus comprises: a plasma display panel PDP; drivers 30 to 36 for driving the plasma display panel PDP; and a controller 38 for controlling the drivers 30 to 36. The controller 38 includes: a display data generator 44 for receiving an input video data Vin and a dot dock Dclk, and for generating display data Dout; a synchronization controller 40, for exercising synchronous control of the plasma display apparatus in response to an externally received vertical synchronization signal Vsync; a driver controller 42, which is synchronously controlled by the synchronization controller 40 and controls the drivers 30 to 36.

The driver controller 42 controls the drivers 30 to 36 in accordance with control signals S1, S2, S3 and S4. Of these drivers, the common X driver 34 drives X electrodes of the plasma display panel PDP; the Y scan driver 30 sequentially drives Y electrodes to perform scanning during the address period; the common Y driver 32 drives the Y electrodes during the sustain period; and the address driver 36 drives address electrodes in accordance with display data Dout during the address period.

Figure 2:
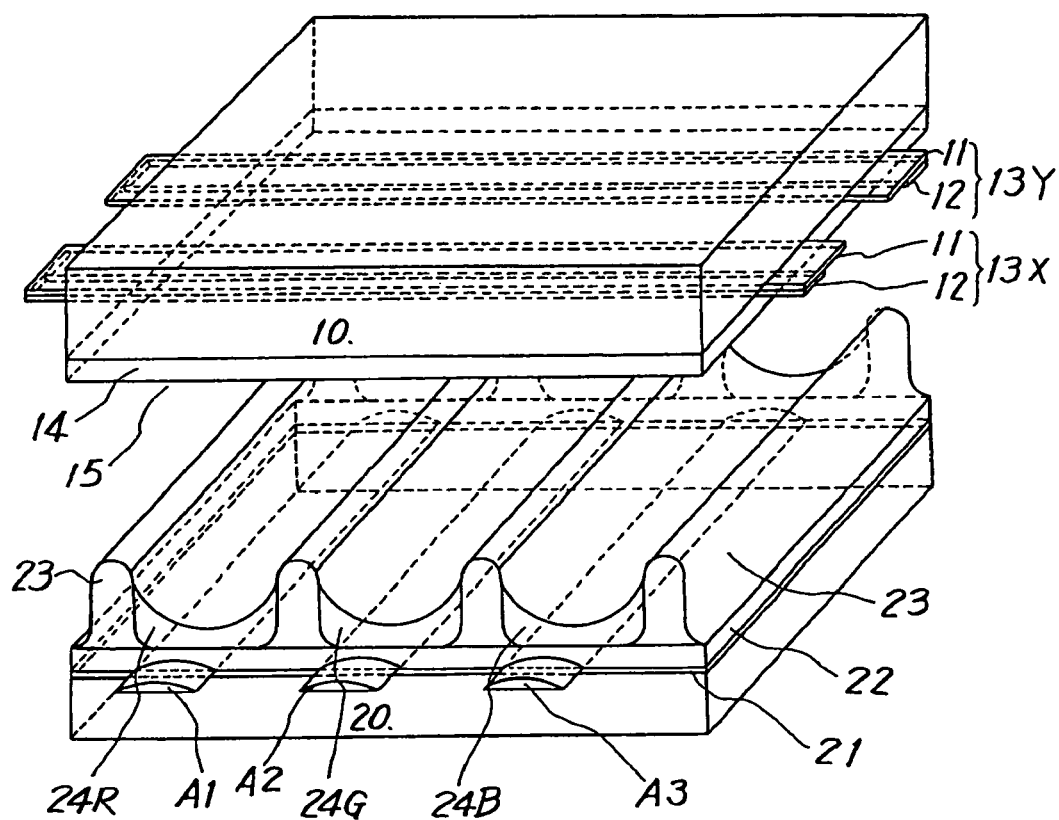
FIG. 2 is an exploded perspective view of a partial structure of a plasma display panel.

FIG. 2 is an exploded perspective view of the plasma display panel PDP. The plasma display panel PDP is a three-electrode, surface discharge plasma display panel having a front substrate 10 and a rear substrate 20. A plurality of pairs of X electrodes 13X, and Y electrodes 13Y, each of which is formed by laminating a transparent electrode 11 and a highly conductive bus electrode 12, are arranged in parallel on the front substrate 10, and deposited on these electrodes are a dielectric layer 14 and a protective layer 15. A plurality of address electrodes A1, A2 and A3, are arranged on an underlayer 21 on the rear substrate 20, and a dielectric layer 22 is formed thereon. Further, on the rear substrate 20, ribs 23 are formed between and along the address electrodes A1 to A3, and red, green and blue phosphors 24R, 24G and 24B, are formed on the address electrodes A1 to A3 and the ribs 23.

In the thus arranged plasma display panel PDP, a discharge is generated across the entire panel between the X and Y electrodes by applying a large reset pulse to them during the reset period RST. At the trailing edge of the reset pulse, an erasing discharge is produced by employing the wall charges generated during the first discharge, so that the wall charges on the dielectric layer 14 of the electrodes X and Y are disappeared. During the address period ADD, following the reset period RST, a scan pulse is sequentially applied to the Y electrodes 13Y, while a write pulse is applied to the address electrodes A1 to A3 in accordance with the display data. A discharge is thus produced between the Y electrodes 13Y and the address electrodes of cells which are to be turned on, and wall charges are accumulated on the dielectric layer 14 of the pertinent cell.

Then, during the sustain period SUS, a predetermined number of sustain pulses, which correspond to the luminance of the sub-frame, are applied to all of the X and Y electrodes, so that sustain discharges are generated only in cells where wall charges have been accumulated and a luminance corresponding to the sub-frame is generated.

Figure 3:
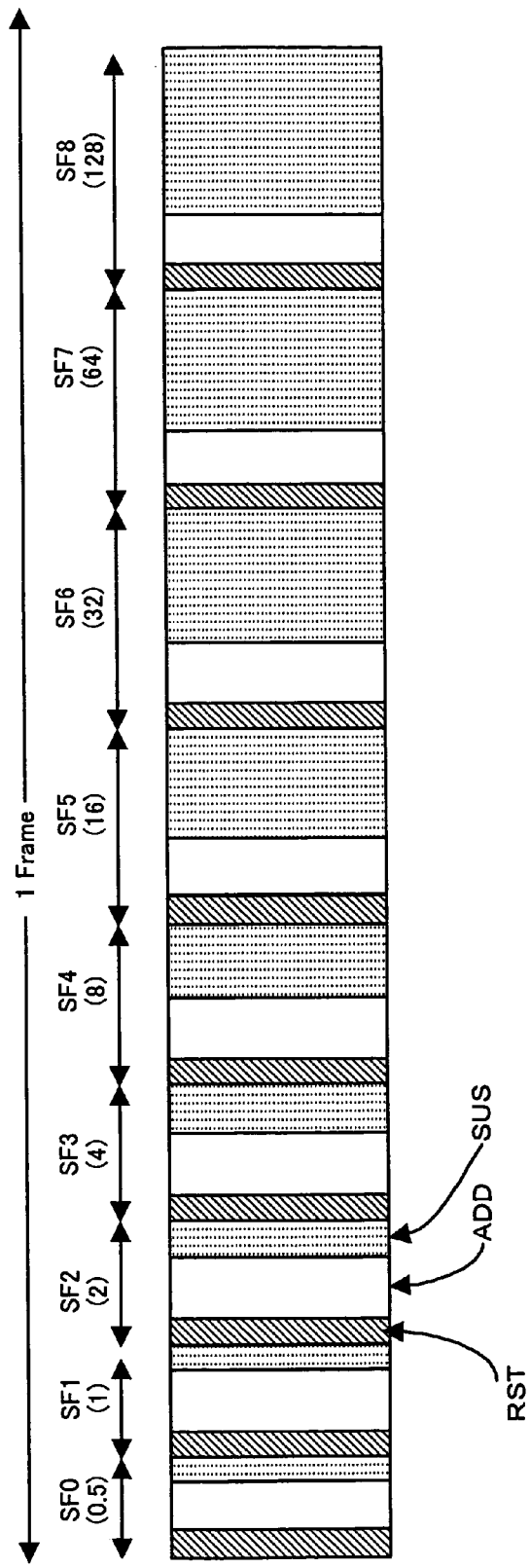
FIG. 3 is a diagram showing a sub-frame system according to the embodiment of the present invention.
Figure 14:
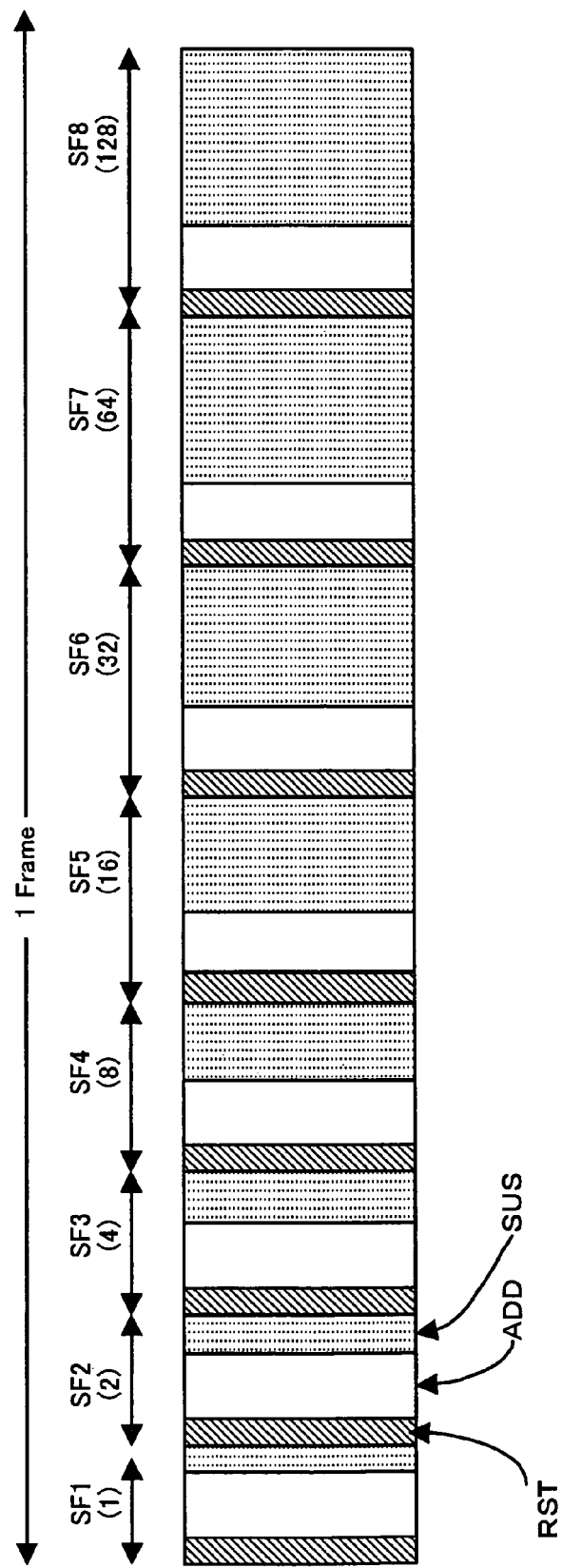
FIG. 14 is a diagram for explaining a sub-frame system for a conventional three-electrode surface discharge AC plasma display panel.

FIG. 3 is a diagram showing a sub-frame system according to this embodiment. Shown in this example, as well as in the conventional sub-frame system shown in FIG. 14, are a combination of sub-frames to be converted for eight-bit input video data having 256 gray scale levels. As is apparent from the comparison of this embodiment with the example in FIG. 14 a smaller luminance sub-frame SF0 is added to the conventional sub-frames SF1 to SF8. The sub-frame SF0 has a luminance value of 0.5, which is smaller than the minimum gray scale level (level 1 in FIG. 3) of the luminance which can be represented by the number of bits in the input video data.

As in the conventional example, each sub-frame SF is constituted by a reset period RST, an address period ADD and a sustain period SUS. For the sub-frames SF1 to SF8, the number of sustain discharge pulses generated during the sustain period SUS is set at a ratio of 1:2:4:8:16:32:64:128. For a newly added, smaller luminance sub-frame SF0, the number of sustain discharge pulses during the sustain period is set at a ratio of 0.5 to the values for the above sub-frames. Since the number a of sustain discharge pulses for the smaller luminance sub-frame SF0 is small, it is not very difficult to add such a sub-frame SF0 during a one-frame period.

The number of smaller luminance sub-frames is not limited to one; more than one may be used. Further, the weight of the smaller luminance sub-frame need not always be ½ of the sub-frame SF1, which has the smallest weight, and may be set using a predetermined ratio which is smaller than the luminance of the sub-frame SF1. An optimal smaller luminance sub-frame is selected within an insertion range to a one-frame period.

Figure 4:
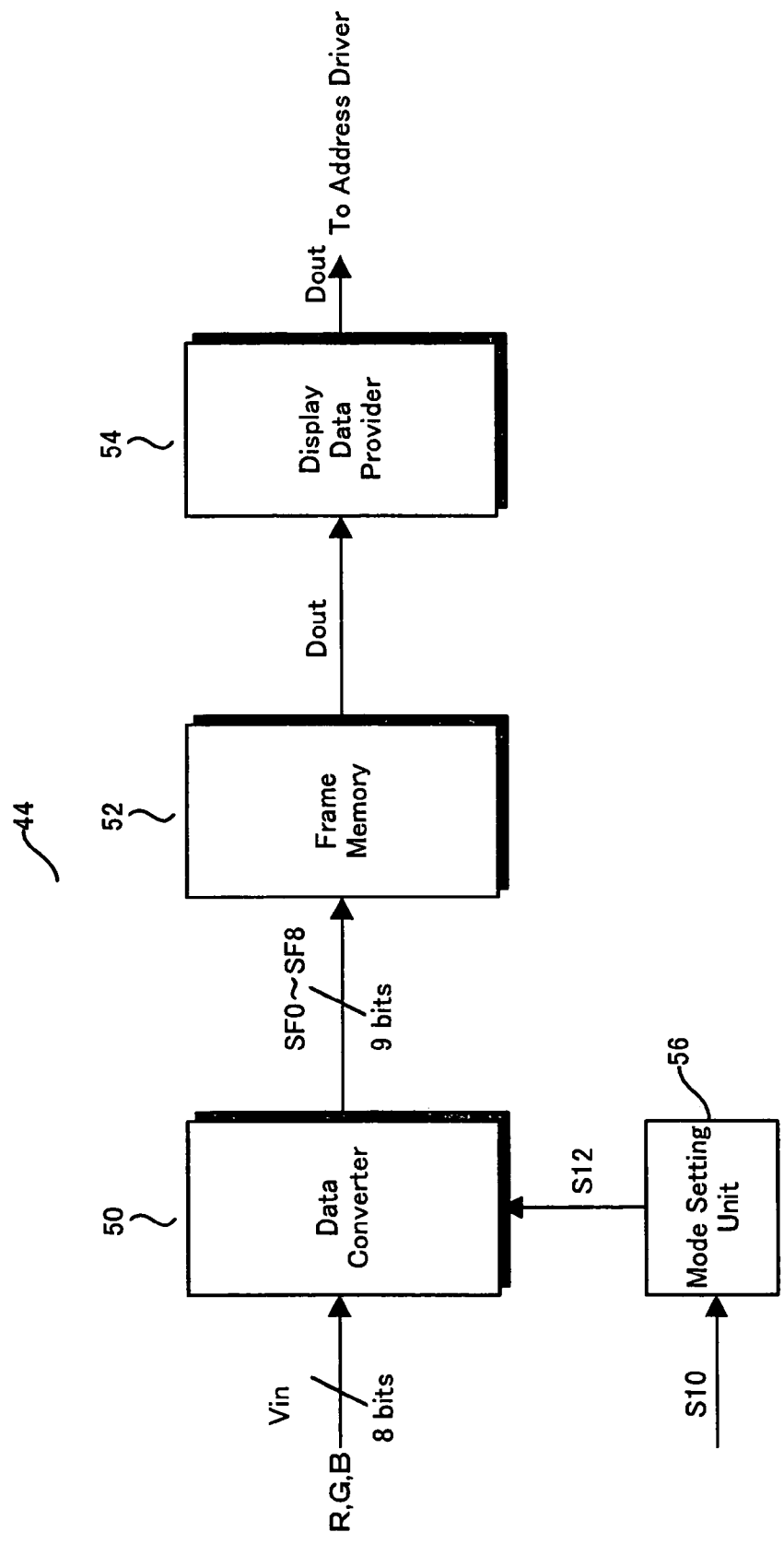
FIG. 4 is a diagram showing the arrangement of a display data generator according to the embodiment of the present invention.

FIG. 4 is a diagram showing the display data generator 44 according to this embodiment. As explained while referring to FIG. 1, the display data generator 44 converts the input video data Vin into the output display data Dout, and in accordance with the timing for the sub-frame, provides the display data for each cell to the address driver 36. As is shown in FIG. 4, the display data generator 44 includes: a data converter 50, for receiving the input video data for the RGB colors and for converting the input video data Vin into display data Dout, in which the ON/OFF states of the sub-frames are specified; a frame memory 52, in which sub-frame data obtained by conversion are stored for each cell; and a display data provider 54, for reading the display data Dout for each cell in consonance with the timing of the sub-frame for providing the display data Dout to the address driver 36 in consonance with the timing for the scanning of the Y electrodes.

As is shown in FIG. 4, the data converter 50 converts the eight-bit input video data Vin for each RGB color into nine-bit display data, in which the ON/OFF states of the sub-frames SF0 to SF8 are specified. Therefore, nine bits of display data are stored for each cell in the frame memory 52. The display data provider 54 reads, along one line of the Y electrodes which are scan-electrodes, the display data Dout which correspond to a currently driven sub-frame SFn(n=0 to 8), and then provides the display data Dout to the address driver 36. Simultaneously, in accordance with the timing for the scanning of the Y electrodes, the address driver 36 transmits the display data Dout for one line of Y electrodes to the address electrodes.

The display data generator 44 includes a mode setting unit 56, for generating a mode set signal S12 in accordance with an externally provided mode instruction signal S10. A plurality of conversion tables corresponding to a number of different display modes are provided for the data converter 50, which selects a conversion table corresponding to the mode set signal S12, which is generated in accordance with the mode instruction signal S10, and converts the eight-bits input video signal Vin into the nine-bits display data Dout, which correspond to the sub-frames.

Figure 5:
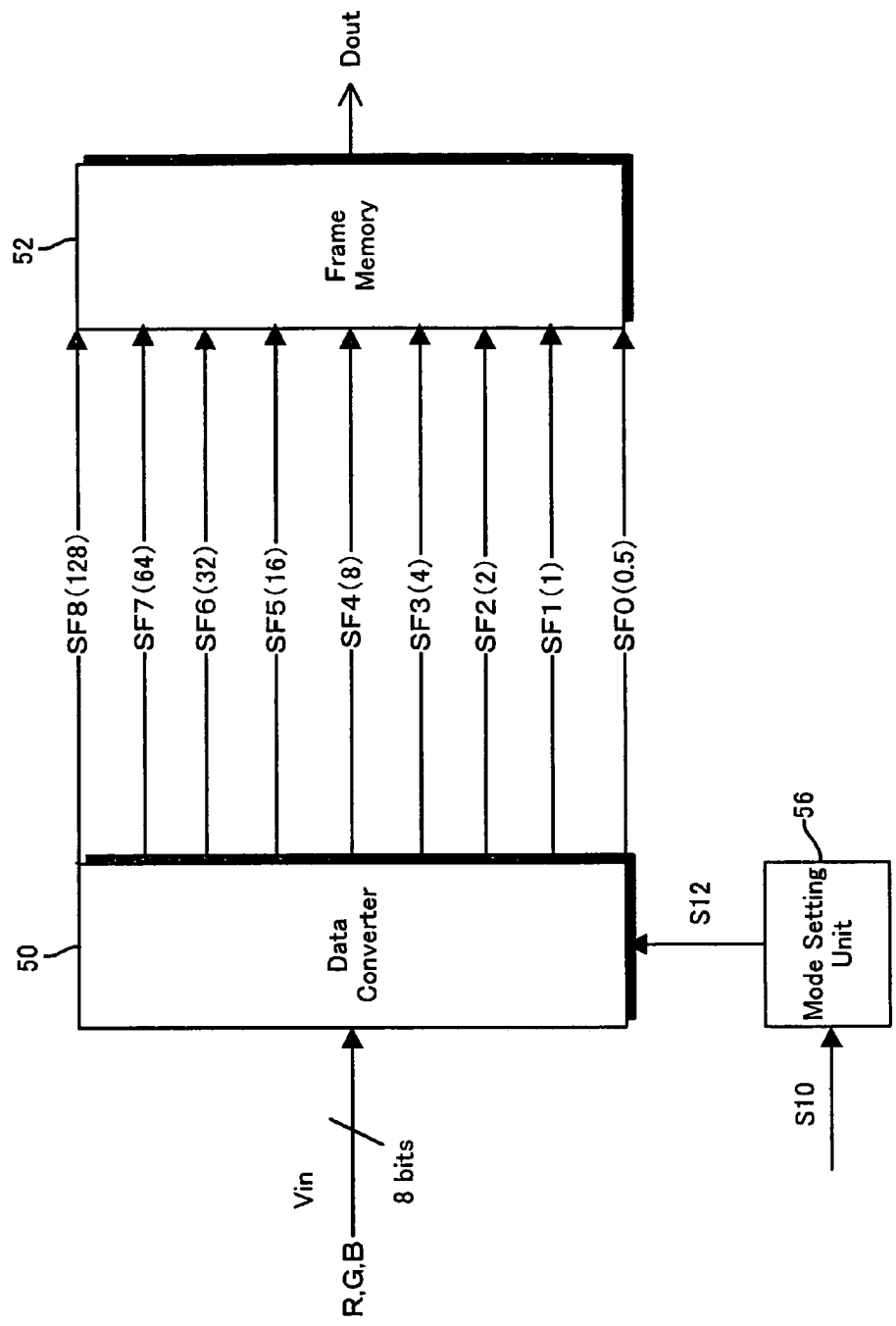
FIG. 5 is a detailed diagram showing the arrangement of a data converter according to the embodiment of the present invention.

FIG. 5 is a detailed diagram showing the arrangement of the data converter 50 according to this embodiment. The data converter 50 receives the eight-bits input video data Vin for each RGB color, employs a conversion table corresponding to the mode set signal S12 to convert the RGB input video data into the nine-bits display data, in which the ON/OFF states of the sub-frames SF0 to SF8 are specified, and stores the display data in the frame memory 52.

Since not only the eight-bits sub-frames SF1 to SF8, as in the conventional examples, but also the smaller luminance sub-frame SF0, having a luminance ratio of 0.5 to the values of the smallest sub-frame, is employed for the eight-bits input video data Vin, the characteristics of the conversion tables can be a variety of characteristics other than the linear function. In other words, the luminance resolutions of output data can be increased without changing the number of bits of the input video data. Therefore, the data converter 50 stores in advance conversion tables having a plurality of characteristics, and to perform data conversion by selecting a conversion table corresponding to mode set signal S12.

Figure 16A:
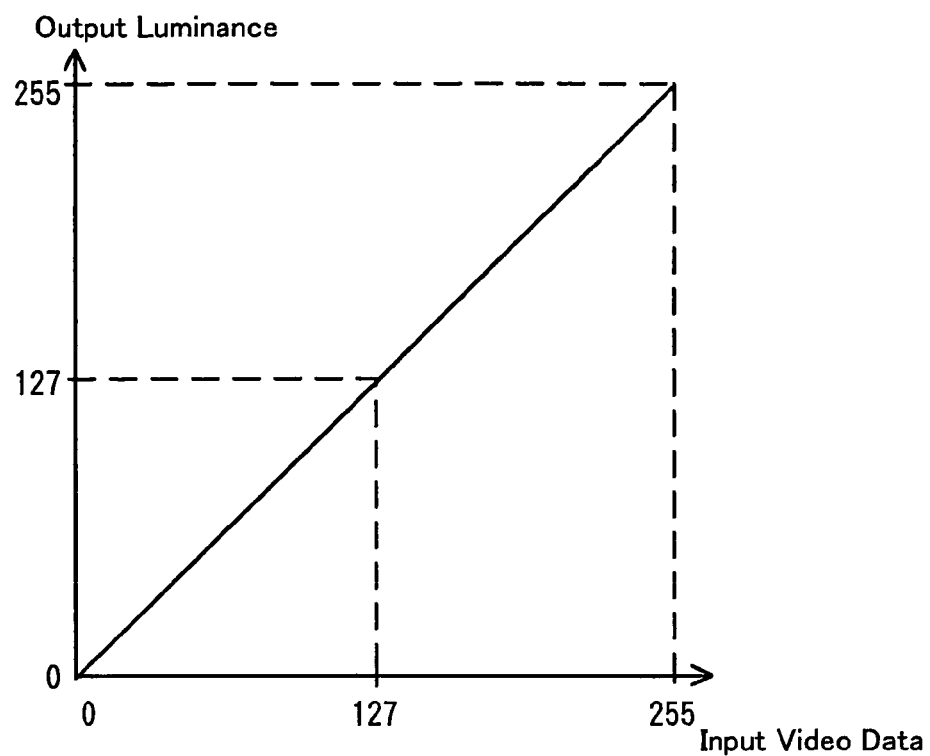
FIGS. 16A and 16B are graphs showing the characteristic of the conversion table of the conventional data converter.
Figure 16B:
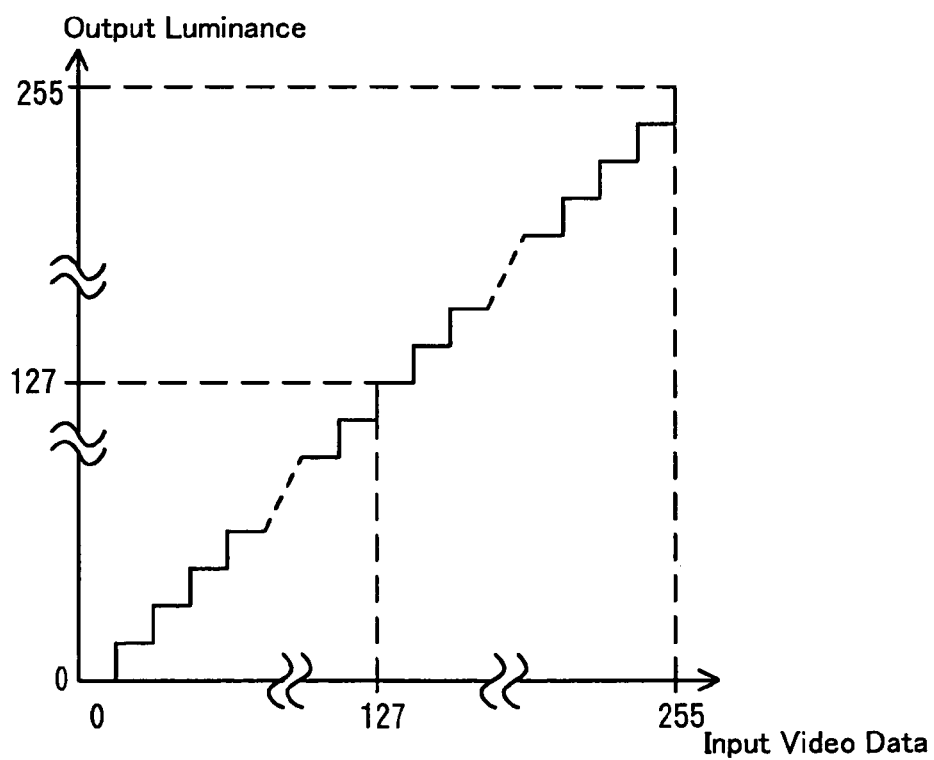

FIGS. 6A to 6C are graphs showing the conversion tables for the data converter 50. In FIG. 6A is shown a linear characteristic for which an output level has a linear function characteristic relative to an input level. This characteristic is the same as that in the conventional conversion table in FIGS. 15 and 16. In this case, the conversion table is the same as that shown in FIG. 15, and the converted output display data are data in that the smaller luminance sub-frame SF0 is always in the OFF state. As the gray scale of the input level is changed, the luminance of the nine-bits output display data is altered by the smallest luminance unit in accordance with the eight-bits input data.

According to the characteristic indicated by the solid line in FIG. 6B, the increase rate of the output level is low in a lower input level area, while the increase rate of the output level is high in a higher input level area. This characteristic is generally called a gamma characteristic, and is an inherent CRT display device phenomenon. That is, since a person can readily identify a difference in luminance in a lower input level area, the gray scale resolution of the luminance is increased to enhance the representation of a dark image. And since a person cannot easily identify a difference in luminance in a higher input level area, the gray scale resolution of the luminance is reduced to prevent an increase in the total number of gray scale levels.

The characteristic described by a broken line in FIG. 6B corresponds to the characteristic described by the solid line, and is a characteristic of the input video data which is provided from external via compensation. When the input video data, which are compensated for in accordance with the characteristic described by the broken line, are converted by using the conversion table of the characteristic described by the solid line, the display data having more appropriate luminance change, in accordance with the change of the input level, can be generated.

The conversion table for the gamma characteristic is the optimal table for the display of images, such as a movie, while the conversion table for the linear characteristic is the appropriate table for the display of graphics, such as graphs and characters.

The characteristic shown in FIG. 6C is the S-shaped characteristic, according to which the rate of change in the output level is low both in a lower input level area and in a higher input level area, and is high in a middle input level area. When, for example, a dark image is displayed on a bright background image, more gray scale levels are provided for each of the images, so that for both images the luminance resolution can be improved. According to this conversion characteristic of the data converter, the increase rate of the luminance of the output data in the first gray scale area of the input video data differs from the increase rate of the luminance of the output data in the second gray scale area, which is higher than the first gray scale area. When these rates differ, an appropriate characteristic other than the S-shaped characteristic can be implemented.

Referring again to FIG. 5, since the smaller luminance sub-frame SF0 is additionally provided, conversion tables having various characteristics can be employed. Therefore, if an operator sets an optical mode, via the mode instruction signal S10, to the mode setting until 56, the data converter 50 can convert the input video data according to the optimal conversion table for the input video data. That is, when the operator selects the optimal mode, image or video to be displayed can be displayed with the optimal mode.

The data converter 50 does not always require a plurality of conversion tables. A conversion table incorporating the gamma characteristic, which conventionally is not implemented, may be permanently stored to perform data conversion. In this case, an external input mode setting instruction is not required.

Figure 8A:
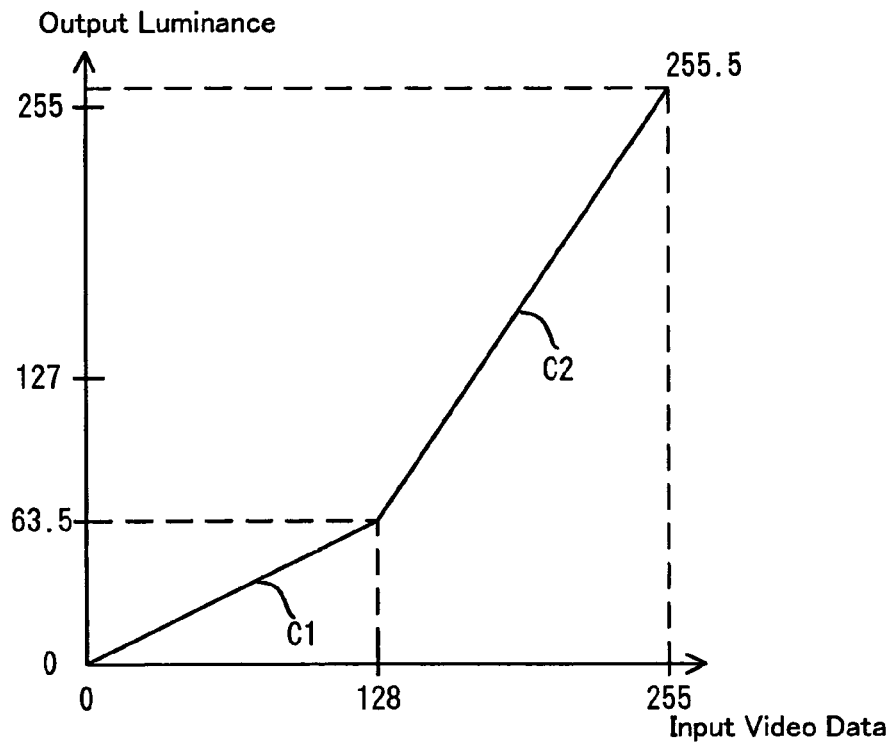
FIGS. 8A and 8B are graphs showing the characteristic of the conversion table in FIG. 7.
Figure 8B:
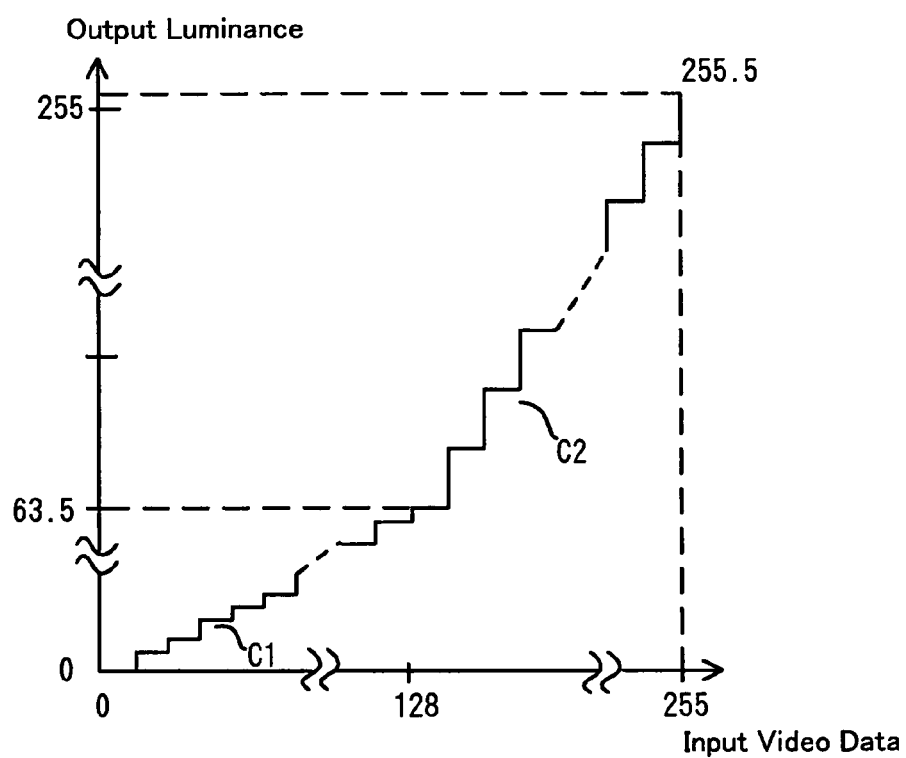

FIG. 7 is a diagram showing the conversion table according to this embodiment in which the gamma characteristic is incorporated, and FIGS. 8A and 8B are graphs showing the characteristics of the conversion table. As is shown in the conversion table in FIG. 7, eight-bits input data having 256 gray scale levels, 0 to 255, are converted into nine-bits output data, in which the ON/OFF states of the sub-frames SF0 to SF8 are specified. The ratio for the luminance levels of the sub-frames is, for example, 0.5:1:2:4:8:16:32:64:128.

According to the conversion table in FIG. 7, in a low input gray scale area of 0 to 128, the luminance of output data is increased with a smaller rate of the smaller luminance sub-frame SF0. In a high input gray scale level area of 128 to 255, the luminance of output data is increased with a higher rate of sub-frame SF2 (a luminance level ratio of 2). For the highest input gray scale level of 255, the maximum luminance level is output to turn on all the sub-frames SF0 to SF8.

In FIG. 8A the characteristic of the conversion table in FIG. 7 is shown which represents the input video data and the output display data (output luminance value). The rate of increase is lower in an area C1 for which the input level, 0 to 128, is also low, while the rate of increase is higher in an area C2 for which the input level, 128 to 255, is also high. Therefore, this characteristic corresponds to the gamma characteristic in FIG. 6B.

FIG. 8B is detailed graph showing the change in the luminance of the output display data relative to the quantization level (skipping digital level) of eight-bits input video data. In an area C1 for which the input level, 0 to 128, is low, the rate of increase is so low that the luminance of the output display data is increased at the luminance ratio of the smaller luminance sub-frame SF0. In an area C2 for which the input level, 128 to 255, is high, the increase rate is so high that the luminance of the output display data is increased at the luminance ratio 2 of the sub-frame SF2.

When the input level area is divided into three or more portions and, beginning at the low level area, the smaller luminance sub-frame SF0 is appropriately employed to gradually advance the rate of increase, a characteristic of the conversion table in FIG. 7 can be closer to the gamma characteristic in FIG. 6B. Further, the characteristic curve can be smoothed by adding more smaller luminance sub-frames. Here, it is preferable that the maximum number of smaller luminance sub-frames be employed within a range corresponding to a one-frame period.

Figure 9:
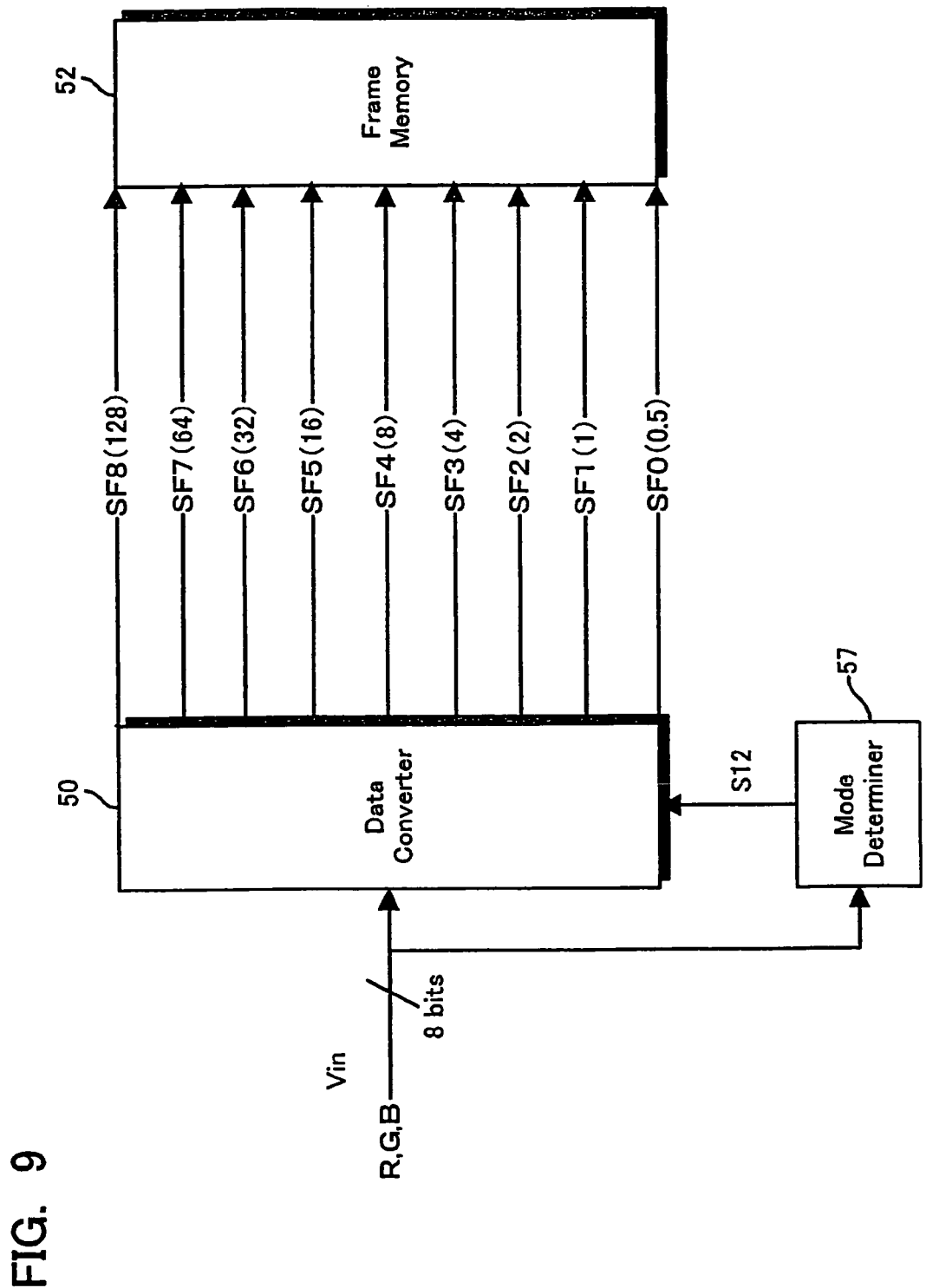
FIG. 9 is a diagram showing the arrangement of another display data generator according to the embodiment of the present invention.

FIG. 9 is a diagram showing another display data generator according to the embodiment. In FIGS. 4 and 5, upon receiving a mode instruction signal S10 the display data generator 44 performs a mode setting process, and to perform data conversion, employs a conversion table corresponding to the designated mode. In the example in FIG. 9, however, a mode determiner 57 analyzes video data Vin to determine whether those data are image data for characters and graphs (images or graphs generated by a computer), or image data for natural images, such as photographs, and generates an optimal mode set signal S12 for the image. Thereafter, to perform data conversion the data converter 50 employs a conversion table corresponding to the mode set signal S12. For example, the conversion table incorporating the linear characteristic in FIG. 6A is selected for characters and graphs, while the conversion table incorporating the gamma characteristic in FIG. 6B is selected for photographs and movies.

The mode determiner 57 can determine, to a degree, the original input video data image type by analyzing the data for a plurality of contiguous frames, or by preparing and analyzing a histogram for each gray scale level included in the input video data for the frames.

Figure 10:
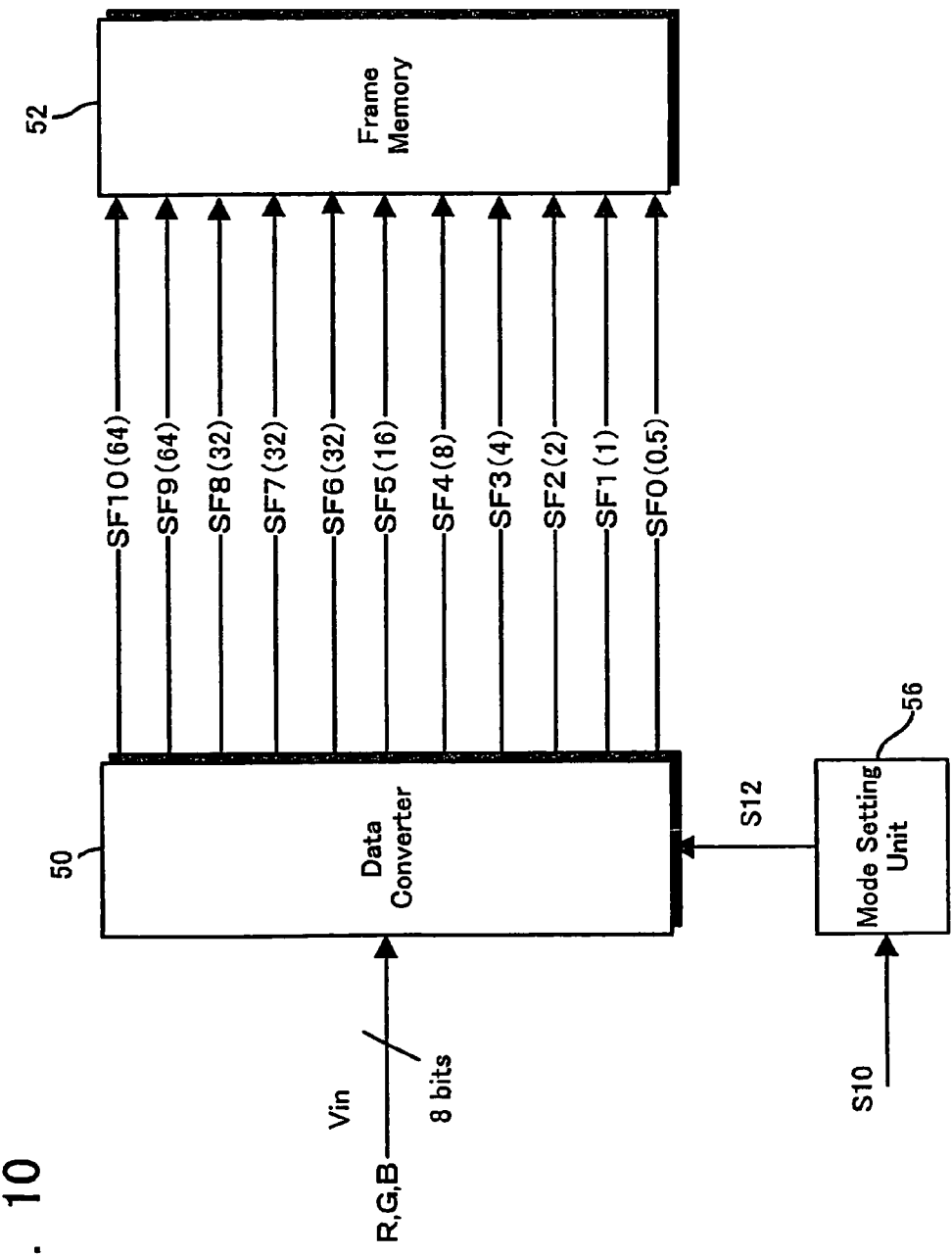
FIG. 10 is a diagram showing the arrangement of an additional display data generator according to the embodiment of the present invention.

FIG. 10 is a diagram illustrating the arrangement of another display data generator according to this embodiment. In the example in FIG. 10 a data converter 50 includes a superimposition method to prevent the occurrence of a so-called false color outline. During the process in which the luminance is represented by using a combination of the sub-frames in FIG. 3, a false color outline occurs when, for examples, images for the luminance levels of 128 and 127 are alternately displayed.

That is, the luminance level for 128 can be generated by turning on the sub-frame SF8, while the luminance level for 127 can be produced by turning on the sub-frames SF1 to SF7. Therefore, if the sub-frames SF0 to SF8 are arranged in order and when the luminance levels 128 and 127 are repeated alternately, the display process for sequentially turning on the sub-frame SF8 and the sub-frames SF1 to SF7 is also repeated. Therefore, flicker occurs and a false color outline is generated when an image is moved.

To prevent the occurrence of this phenomenon, a superimposition method has been proposed. According to this method, a sub-frame having a high luminance level is divided, and the sub-frames in a single frame are arranged so that sub-frames having high luminance levels are not adjacently positioned. In the example in FIG. 10, the eight-bits input video data Vin, with which 256 gray scale levels are provided, are converted into output data for a sub-frame combination consisting of smaller luminance sub-frame SF0 and sub-frames SF1 to SF10.

The luminance ratio for the ten sub-frames SF1 to SF10 is 1:2:4:8:16:32:32:32:64:64. That is, the sub-frame SF7, which has a luminance level of 64, is divided into sub-frames SF7 and SF8, each of which has a luminance level of 32, and the sub-frame SF8, which has a luminance level of 128, is divided into sub-frames SF9 and SF10, each of which as a luminance level of 64.

FIG. 11 is a diagram showing a conversion table incorporating the gamma characteristic which uses the superimposition method. The characteristic for this conversion table is the same as that shown in FIGS. 8 and 9. That is, when the superimposition method is used, the conversion table in FIG. 7 can be changed to the conversion table in FIG. 11. Then, according to the conversion table in FIG. 11, in a low input level area the luminance of the output data is changed by the luminance ratio 0.5 for the smaller luminance sub-frame, while in a high input level area the luminance of the output data is changed by the luminance ratio 2.0 for the sub-frame SF2;

It should be noted that, in accordance with the conversion table in FIG. 11, the sub-frames SF7 (32) and SF8 (32) are simultaneously turned on when the sub-frame SF7 (64) is turned on in FIG. 7. Similarly, when the sub-frame SF8 (128) is turned on in FIG. 7, the sub-frames SF9 (64) and SF10 (64) are simultaneously turned on in FIG. 11. When the superimposition method is used, the sub-frames SF0 to SF10 in FIG. 11 are randomly arranged.

Figure 12:
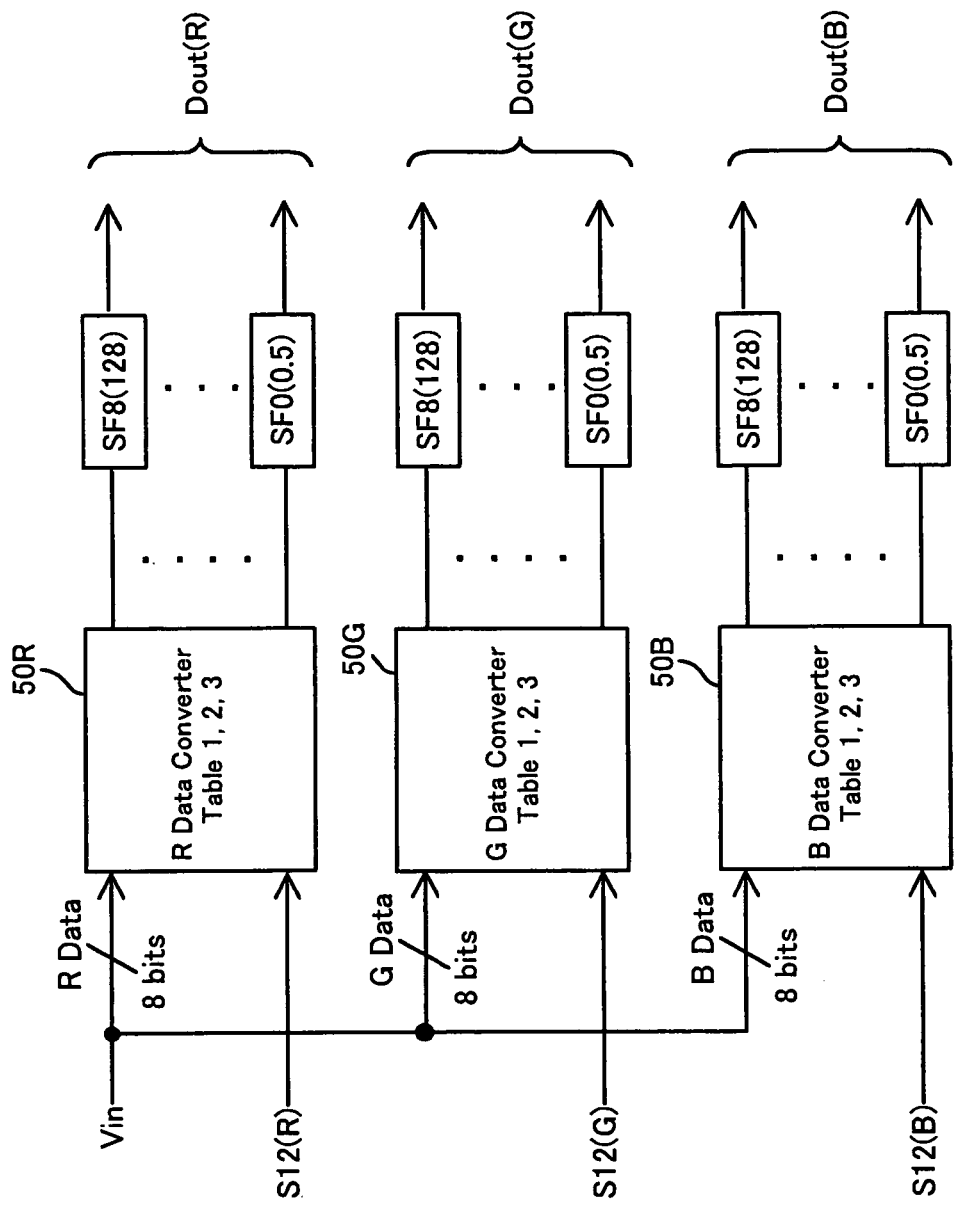
FIG. 12 is a diagram showing another example data converter.

FIG. 12 is a diagram showing another data converter. The data converter 50 in FIG. 12 can select a conversion table, as needed, for each of the three primary, RGB, colors. When the appropriate conversion table is selected for each color, an image can be displayed for which a desired tint (color temperature) is used. Further, the optimal conversion table can be selected in accordance with the characteristic of a phosphor which corresponds to a color.

For RGB, the data converter 50 in FIG. 12 includes data converters 50R, 50G and 50B, each of which receives eight-bits input video data Vin. Each data converter converts the received input video data Vin into display data Dout (R), Dout (G) or Dout (B) for a nine-bits sub-frames by using an appropriate conversion table which is selected from among three tables provided for this purpose in accordance with a mode set signal S12R, S12G or S12B.

Figure 13:
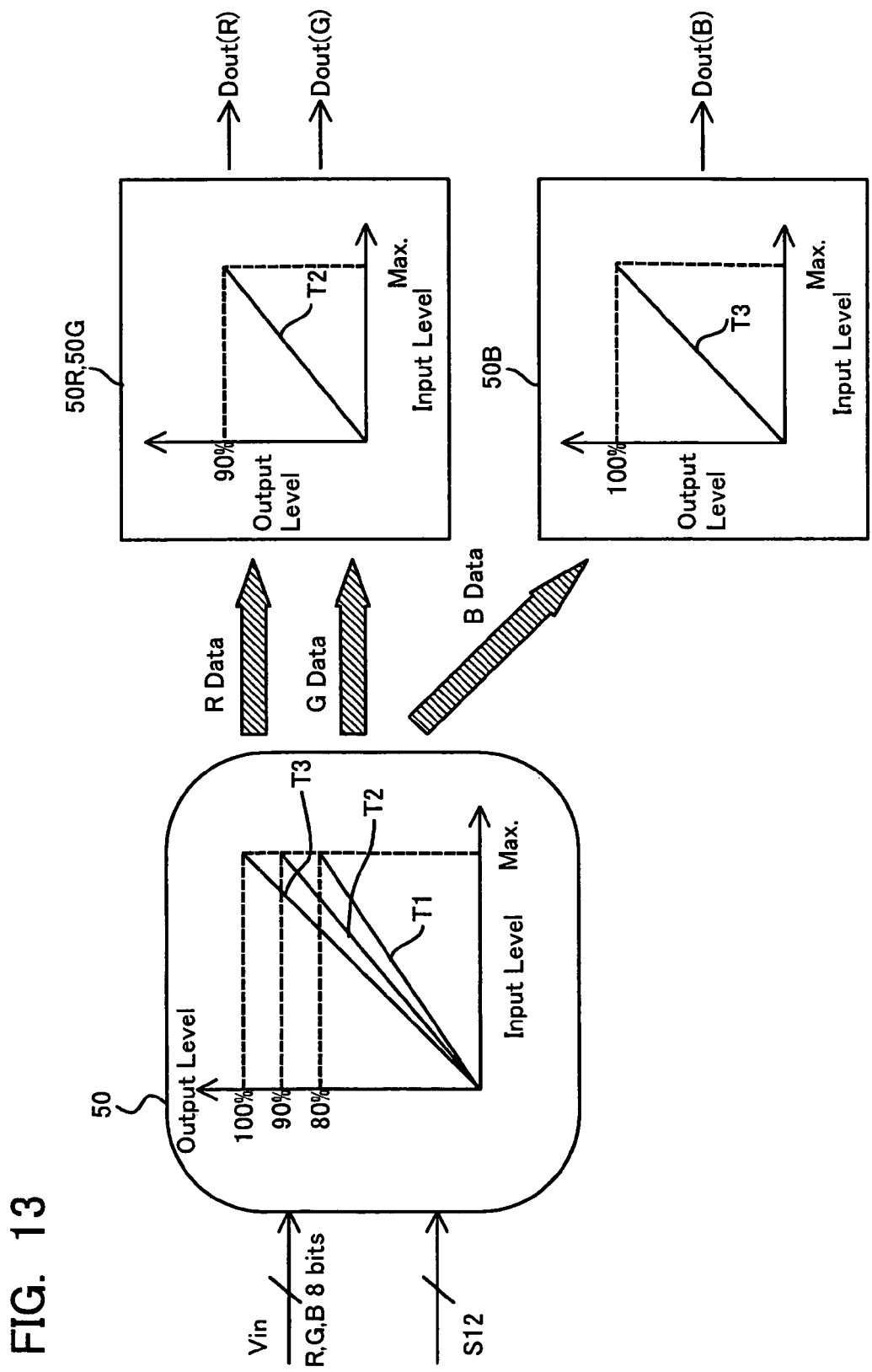
FIG. 13 is a diagram showing an example wherein tint (color temperature) is changed by using the data converter in FIG. 12.

FIG. 13 is a diagram showing an example for which the data converter 50 in FIG. 12 is used to change a tint (a color temperature). As is shown in FIG. 13, the conversion tables provided for the data converter 50 are a first conversion table T1, used to provide a luminance of 80% relative to the maximum input level; a second conversion table T2, used to provide a luminance of 90% relative to the maximum input level; and a third conversion table T3, used to provide a luminance of 100% relative to the maximum input level. In this case, the second conversion table T2 is employed for input data for red R and green G, and the third conversion table T3 is employed for input data for blue B.

As a result, a synthesized image is slightly bluish which is a higher color temperature. Therefore, an image which is preferred by Japanese people can be displayed by using a combination of the above conversion tables.

On the other hand, when the third conversion table T3 is employed for the input data for red R and the second conversion table T2 or the first conversion table T1 is employed for the input data for green G and blue B, a reddish image having a lower color temperature, which is preferred by Western people, can be displayed.

The three types of conversion tables can be tables all of which have the gamma characteristic, but have lower luminance, middle luminance and higher luminance for all input levels. In this case, for video data which are obtained by gamma compensation, an image having a high or low color temperature can be selectively displayed, while a high luminance resolution in a low gray scale area is maintained.

As is describe above, since an appropriate conversion table can be selected for each color, an image having a desired tint (color temperature) can be displayed.

The data converter of the invention converts the input video data into display data which is constituted by sub-frames, including a smaller luminance sub-frame which can display an image at a luminance level lower than the minimum gray scale level generated by the input data. The characteristics of the conversion tables are not limited to those described above, and can be variously modified. Further, when a different conversion table is employed for each color, a greenish image can be displayed by adjusting a deviation in a color temperature curve graph in the positive direction, or a reddish image can be displayed by adjusting the deviation in the negative direction, without any restrictions being imposed relative to color temperatures.

According to the present invention, in accordance with the gamma characteristic, the input video data can be converted into display data in which the ON/OFF states of sub-frames are specified, an image, a photograph or a movie, can be optimally displayed, and the image quality can be improved.

Furthermore, according to the present invention, the input video data can be converted into display data accounting to an optimal conversion characteristic for an input image, and the image quality can be enhanced.

In addition, according to the present invention, an image can be displayed at an optimal color temperature, and the color temperature of an image to be displayed can be selected as needed.

The protective scope of the present invention is not limited to the above embodiment, but can cover the invention as cited in the included claims for the invention and its equivalents.

What is claimed is:

1. A plasma display apparatus, which represents the luminance of one frame in accordance with a combination of sub-frames having respective predetermined luminance levels, comprising:
    a data converter converting input video data into output data in which ON/OFF states of the sub-frames are specified, the data converter having a conversion characteristic in which a rate of increase of luminance of said output data, in a first gray scale area of said input video data, differs from a rate of increase of said luminance of said output data in a second gray scale area, whose luminance is higher than said first gray scale area,
    wherein luminance of the one frame is displayed according to a combination of sub-frames including a sub-frame for minimum gray scale level in the first gray scale area, and the luminance of the one frame is displayed according to a combination of sub-frames excluding the sub-frame for minimum gray scale level in the second gray scale area.

2. A plasma display apparatus according to claim 1, wherein said data converter has a plurality of conversion characteristics, and a desired conversion characteristic is selected in accordance with a mode set signal for selecting a desired one of said plurality of conversion characteristics.

3. A plasma display apparatus according to claim 1, wherein said input video data are supplied in accordance with a plurality of primary colors, and said conversion characteristics of said data converter are selectively determined for each of said primary colors.

4. A data converter for a plasma display apparatus which represents the luminance of one frame in accordance with a combination of sub-frames having respective, predetermined luminance levels, wherein input video data are converted into output data in which ON/OFF states of the plurality of sub-frames are specified,
    wherein the data converter has a conversion characteristic in which a rate of increase of the luminance of said output data, in a first gray scale area of said input video data, differs from a rate of increase of said luminance of said output data in a second gray scale area, whose luminance is higher than said first gray scale area, and
    the data converter outputs said output data having a combination of sub-frames including a sub-frame for minimum gray scale level in the first gray scale area, and a combination of sub-frames excluding the sub-frame for minimum gray scale level in the second gray scale area.

5. A driving method for a plasma display apparatus which represents luminance of one frame in accordance with a combination of sub-frames having respective, predetermined luminance levels, comprising:
    converting input video data into output data in which ON/OFF states of the plurality of sub-frames are specified, the data converting having a conversion characteristic in which a rate of increase of the luminance of said output data, in a first gray scale area of said input video data, differs from a rate of increase of said luminance of said output data in a second gray scale area, whose luminance is higher than said first gray scale area,
    wherein a luminance of the one frame is displayed according to a combination of sub-frames including a sub-frame for minimum gray scale level in the first gray scale area, and the luminance of the one frame is displayed according to a combination of sub-frames excluding the sub-frame for minimum gray scale level in the second gray scale area.

* * * * *

UNITED STATES PATENT AND TRADEMARK OFFICE
CERTIFICATE OF CORRECTION

PATENT NO. : 7,466,292 B2
APPLICATION NO. : 11/272142
DATED : December 16, 2008
INVENTOR(S) : Ayahito Kojima et al.

It is certified that error appears in the above-identified patent and that said Letters Patent is hereby corrected as shown below:

Title Page, Column 1 Item [60] (Related U.S. Application Data), Line 2, change "2005," to --2000,--.

Column 1, Line 7, change "2005," to --2000,--.

Signed and Sealed this

Thirty-first Day of March, 2009

JOHN DOLL
*Acting Director of the United States Patent and Trademark Office*